United States Patent
Jue et al.

(10) Patent No.: US 6,766,447 B1
(45) Date of Patent: Jul. 20, 2004

(54) SYSTEM AND METHOD OF PREVENTING SPECULATIVE READING DURING MEMORY INITIALIZATION

(75) Inventors: Stephen D. Jue, Round Rock, TX (US); Matthew B. Mendelow, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/490,937

(22) Filed: Jan. 25, 2000

(51) Int. Cl.[7] .......................... G06F 15/177; G06F 9/00; G06F 9/24; G06F 9/445
(52) U.S. Cl. .................. 713/2; 713/1; 713/2; 713/100; 712/234; 712/235; 712/236; 711/6; 711/119; 711/120; 711/121; 711/122; 711/137; 711/154
(58) Field of Search ............................ 713/1, 2, 100; 712/234–236; 711/6, 119–122, 137, 154

(56) References Cited

U.S. PATENT DOCUMENTS

| | | | |
|---|---|---|---|
| 5,163,145 A | | 11/1992 | Parks .......................... 395/500 |
| 5,423,029 A | | 6/1995 | Schieve ....................... 395/575 |
| 5,454,117 A | * | 9/1995 | Puziol et al. .................. 712/23 |
| 5,559,753 A | | 9/1996 | Kocis .......................... 365/236 |
| 5,592,616 A | | 1/1997 | Finch et al. ............ 395/183.18 |
| 5,611,063 A | * | 3/1997 | Loper et al. ................. 712/205 |
| 5,740,417 A | * | 4/1998 | Kennedy et al. ............. 712/239 |
| 5,768,576 A | * | 6/1998 | Hoyt et al. ................... 712/238 |
| 5,799,179 A | * | 8/1998 | Ebcioglu et al. ............. 712/234 |
| 5,812,491 A | * | 9/1998 | Shinozaki et al. ........... 365/233 |
| 5,815,699 A | | 9/1998 | Puziol et al. ................. 395/586 |
| 5,864,692 A | * | 1/1999 | Faraboschi et al. ......... 712/216 |
| 5,926,831 A | * | 7/1999 | Revilla et al. ............... 711/137 |
| 5,941,980 A | * | 8/1999 | Shang et al. ................. 712/204 |
| 5,948,095 A | * | 9/1999 | Arora et al. ................. 712/200 |
| 6,098,166 A | * | 8/2000 | Leibholz et al. ............. 712/216 |
| 6,216,224 B1 | * | 4/2001 | Klein ............................. 713/1 |
| 6,253,288 B1 | * | 6/2001 | McAllister et al. .......... 711/137 |
| 6,330,667 B1 | * | 12/2001 | Klein ............................. 713/1 |
| 6,338,133 B1 | * | 1/2002 | Schroter ....................... 712/214 |
| 2001/0044875 A1 | * | 11/2001 | Mailloux et al. ............ 711/105 |

OTHER PUBLICATIONS

U.S. Pending patent application Ser. No. 08/727,256 entitled "Method of Testing Detection and Correction Capabilities of ECC Memory" by Stephen Cooper ; Dell USA, L.P., Filed Oct. 8, 1996.

* cited by examiner

Primary Examiner—Thomas Lee
Assistant Examiner—Nitin Patel
(74) Attorney, Agent, or Firm—Baker Botts L.L.P.

(57) ABSTRACT

A method of initializing random access memory during a BIOS process executed by a processor that is configured to perform speculative reading. The ROM BIOS is modified such that speculative reading is prevented during the memory initialization.

24 Claims, 2 Drawing Sheets

SYSTEM AND METHOD OF PREVENTING SPECULATIVE READING DURING MEMORY INITIALIZATION

TECHNICAL FIELD

The following description relates to microprocessors, and more particularly to microprocessors that use speculative reading.

BACKGROUND

Many of today's microprocessors, notably Pentium processors, use processing techniques collectively referred to as "dynamic execution" techniques. These techniques are associated with multistage execution ("pipelining") and are designed to increase processing speed by eliminating wasted instruction loading resulting from branching. The various techniques include branch prediction and speculative reading and execution.

Branch prediction is the capability of the processor to predict which branch of a conditional jump or loop the processor will take. As a result of branch prediction, the processor guesses which instructions to read ahead and load into the pipeline. Because the processor is guessing at what instructions to read ahead, this technique is called "speculative execution."

SUMMARY

It is recognized that processors that use dynamic execution techniques may cause problems during initialization of random access memory. It is further recognized these problems are associated with the computer code that implements the initialization, which has one or more branches that cause the processor to perform speculative reading. The following description presents several examples of branches that occur within the BIOS code and that may lead to initialization failures due to speculative reading.

Solutions to the memory initialization problem involve identifying processors and code that can cause problems. If a source (or a potential source) of the problem is discovered, steps can be taken to prevent speculative reading during the initialization.

An advantage of the above-described process is that a potential problem that can occur with certain processors during memory initialization is both detected and prevented from occurring. In the absence of the herein-described relationship between speculative reading and memory initialization, memory initialization failures could occur and not be easily diagnosed.

DETAILED DESCRIPTION

Figure 1:
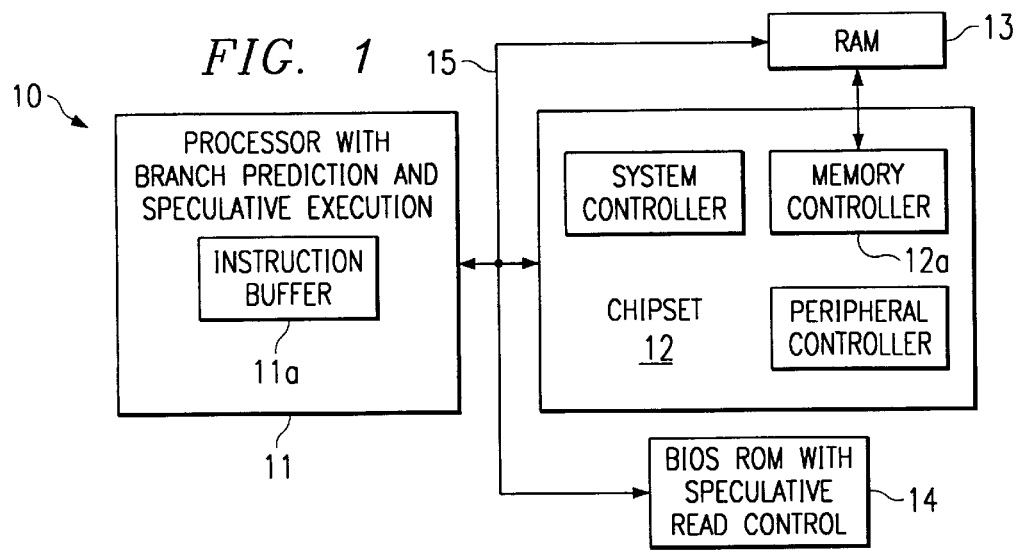
FIG. 1 illustrates various system components of a computer system.

FIG. 1 illustrates various components of a computer system 10. It should be understood that FIG. 1 is not intended to be a comprehensive illustration of a personal computer, but rather merely to illustrate components relevant to this patent application. Other than the speculative read control associated with BIOS 14, the components illustrated in FIG. 1 are typical of a general purpose computer system. They may be generally referred to as "system components", as distinguished from peripheral devices.

Processor 11 is a general purpose microprocessor, characterized by its use of branch prediction and speculative execution of its instruction flow. It has at least one instruction buffer 11a. Data communications between processor 11 and other system components are via an internal bus 15.

As stated in the Background, branch prediction and speculative execution are techniques used to predict which branches of instructions are likely to be processed next. These mechanisms look ahead and load instruction buffer 11a with instructions. If the branch prediction was incorrect, the instruction buffer 11a is flushed so that the correct instructions can be loaded and executed.

Branch prediction and speculative execution are significant developments in providing faster processing. However, as explained below, a yet unrecognized problem associated with these techniques may occur during memory initialization. The erroneous reading of a memory address can cause the initialization process to fail. Thus, the specific culprit is the "speculative read" aspect of speculative execution.

Examples of processors that use speculative reading are the Pentium Pro, Pentium II, and Pentium III processors, all manufactured by the Intel Corporation. These processors use speculative reading as part of a set of "dynamic execution" techniques that include branch prediction and speculative execution. For purposes of example, the following description is in terms of the Pentium Pro processor and its particular operating characteristics. However, the same concepts could be applied to other processors, with a common feature being the use of speculative reading.

Controller chipset 12 represents a typical configuration of various control functions associated with operation of computer 10. In the embodiment of FIG. 1, chipset 12 provides system controller, peripheral controller, and memory controller functions. In other embodiments of computer 10, as an alternative to a single chipset, other configurations to implement the same functions could be used, such as discrete controller components.

RAM 13 is the "system memory" for the computer. RAM 13 may be any type of RAM suitable for system memory. In the example of this description, RAM 13 is assumed to be SDRAM.

BIOS ROM 14 stores the BIOS (basic input/output system) code. In general, the BIOS is built-in software that determines what the computer can do without accessing programs from disk storage. The various parts of BIOS are a power-on self-test (POST), a setup utility, internal diagnostics, and system BIOS. The BIOS process is fairly standardized, although there are a number of variations and extensions. BIOS ROM 14 may be flash ROM, a type of EEPROM.

Because RAM is faster than ROM, computer 10 is designed so that the BIOS is copied from ROM 14 to RAM 13 each time the computer is booted. This process is sometimes referred to as "shadowing". Addresses are re-mapped so that BIOS routines are seen at their expected addresses. As a prelude to shadowing, RAM 13 must be initialized. This initialization and shadowing occurs during the POST BIOS process.

Figure 2:
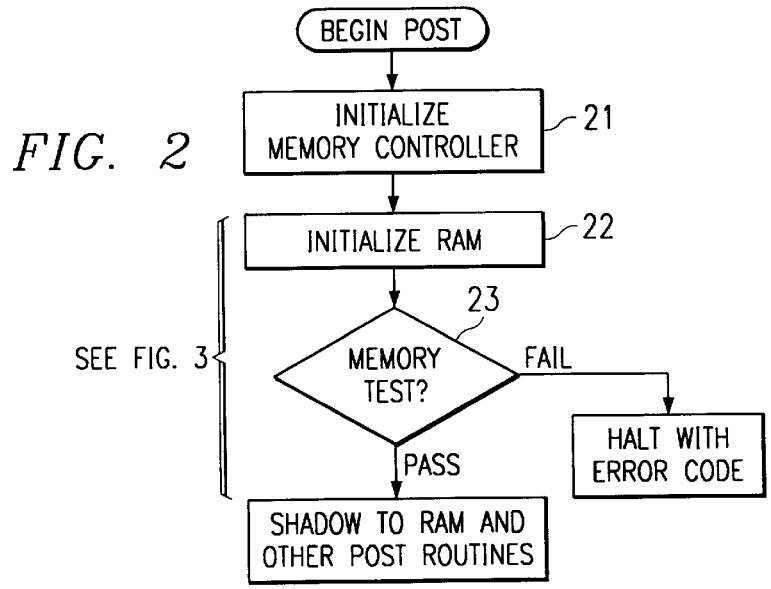
FIG. 2 illustrates the beginning of a typical BIOS process.

FIG. 2 illustrates the very beginning of a typical BIOS POST process, as performed by processor 11 executing BIOS code from ROM 14. As explained below, this part of the POST process includes RAM initialization and can be adversely affected by speculative reading performed by processor 11.

In Step 21, the memory controller 12a of chipset 12 is initialized. In Step 22, RAM 13 is initialized. Step 23 is a rudimentary test to determine if RAM 13 is functional. Steps 22 and 23 are explained below in connection with FIG. 3. If the memory test of Step 23 is failed, the POST process is halted. If the memory test of Step 23 is passed, the POST process continues by performing the memory shadowing, as well as all other POST routines.

Figure 3:
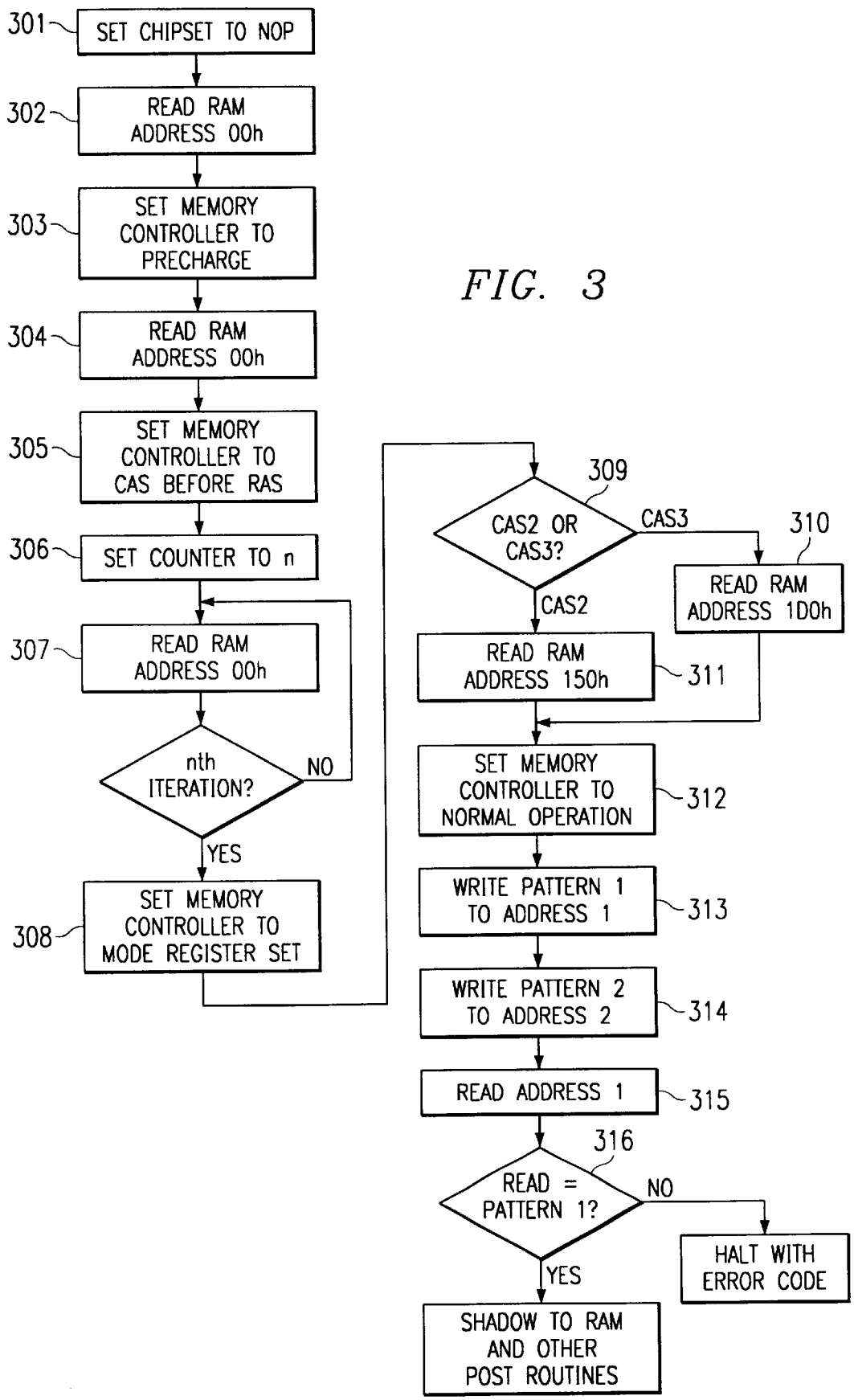
FIG. 3 illustrates the memory initialization and memory testing steps of FIG. 2 in further detail, and provides an example of instructions that trigger speculative reading and possible associated failures.

FIG. 3 illustrates an example of Steps 22 (memory initialization) and Step 23 (memory testing) of FIG. 2 in further detail. More specifically, FIG. 3 illustrates one example of a branch instruction within the BIOS code that implements memory initialization. This branch instruction results in a speculative read by processor 11.

In Step 301, memory controller 12a is set to a NOP (no operation) command. In Step 302, address 00h of RAM 13 is read. In Step 303, memory controller 12a is set to all banks precharge. In Step 304, address 00h is RAM 13 is read. In Step 305, memory controller 12a is set to a CAS (column address strobe) before RAS (row address strobe) mode. In Step 306, a counter is set to some value of n, which is a low value such as eight. In Step 307, address 00h of RAM 13 is read. Step 307 is repeated until the count ends. In Step 308, memory controller 12a is set to mode register set.

Step 309 assumes that RAM 13 has one of two particular configurations, that is, that it has either a CAS2 or CAS3 latency rating. These CAS latency ratings vary from chip to chip and with bus speed, and determine when a read can occur relative to a clock. As an example, these two different CAS latency ratings are typically associated with a RAM 13 having DIMM (dual in-line memory module) packaging. In Step 309, the BIOS POST routine determines whether RAM 13 is configured for CAS2 or CAS3.

Step 310 is performed if RAM 13 is set for CAS3 operation. It causes a certain address, here 1D0h, to be read. Step 311 is performed if RAM 13 is set for CAS2 operation. It causes a different address, here 150h, to be read. These addresses, 1D0h and 150h, are those associated with a chipset 12 manufactured by the Intel Corporation. However, these particular addresses are for purposes of example only. Other memory initialization processes might use different addresses.

The programming for Step 309, 310, and 311 might look something like the following:

.

.

.

[test for CAS2 or CAS3]
   JNZ CAS3 start; jump if CAS3
CAS2 start: MOV EAX,[150h]; read 150h
   JMP DONE
CAS3 start: MOV EAX,[1D0h]; read 1D0h

.

.

The JNZ (jump if not zero) instruction checks for a flag (zero) and jumps if the flag is not set. Thus, during memory initialization, the BIOS process has instructions for a branch, whose proper execution depends on which CAS latency rating is associated with processor Sub branches, which occur for certain DIMM configurations, are described below in connection with FIG. 4.

Step 312 sets memory controller 12a to normal operation. In Step 313, a first pattern is written to a first address, such as 00h. In Step 314, a second pattern is written to a second address, such as 08h. In Step 315, the first address is read. Step 316 corresponds to Step 23 of FIG. 2. In Step 316, the results of Step 315 are compared with the first pattern. If the read was correct, the BIOS process continues with the memory shadowing of FIG. 2. If not, the BIOS process is halted with an error code.

Various delays between the above-described steps are not shown. However, the particular sequence and timing of these steps is significant to proper memory initialization.

Figure 4:
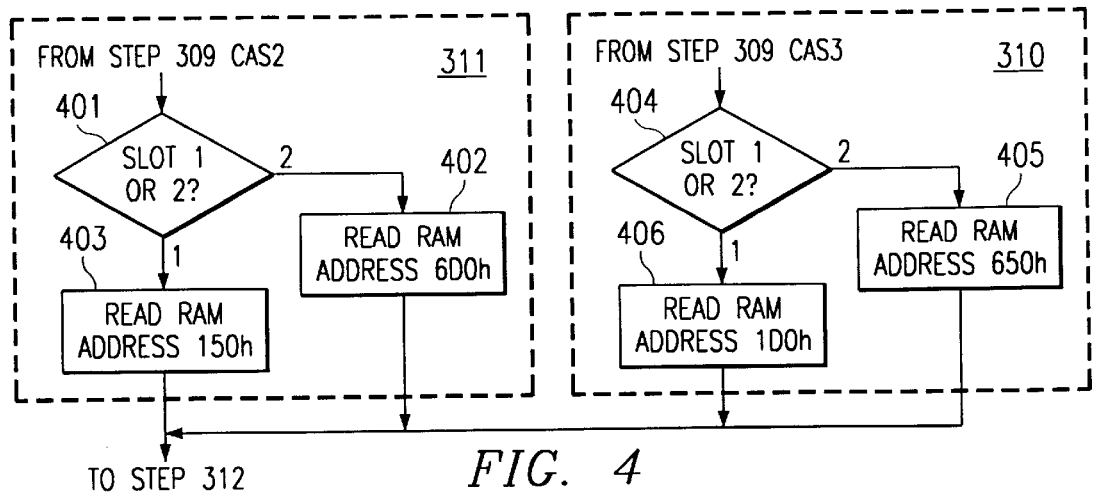
FIG. 4 illustrates sub branches within the two possible instruction paths of FIG. 3.

FIG. 4 illustrates the sub branches referred to above in connection with Step 309 of the memory initialization routine. These sub branches occur for certain DIMM modules where memory signals are inverted from one DIMM slot to another. Step 401 occurs when RAM 13 has a CAS2 latency. Either of Steps 402 or 403 is performed, depending on which of two slots contains the DIMM. For one slot, a first address is read. For the other slot, a different address is read. In the example of this description, these addresses are 6D0h and 150h, respectively, where 6D0h is the result of inverting bits 7 through 10 of the address 150h. A similar sequence is followed for a CAS3 RAM 13.

Consistent with FIG. 4, for certain DIMM configurations, the instructions would include the CAS2/CAS3 branch as well as a sub branch within each of the two paths of the instruction code. That is, within the flow for CAS2 and within the flow for CAS3, a sub branch would be performed depending on slot position.

As a result of branching (or sub branching) within the BIOS process, processor 11 performs a speculative read. This causes two memory addresses to be accessed, when only one is properly part of the BIOS memory initialization routine to be actually executed. Because the sequence and timing of memory reads is important to the initialization, the erroneous memory access can prevent proper memory initialization. In the case where RAM 13 is an SDRAM, address lines are interpreted as commands during memory initialization.

The occurrence of problems associated with speculative reading during BIOS memory initialization may be related to system timing. The problem may be more likely to occur in some computers than others. However, if a BIOS process fails to execute properly, the above described problem is not one that is easily diagnosed, especially with regard to its relationship to branch prediction.

To prevent the above-described problems, prior to initializing random access memory, a determination can be made whether speculative reading is likely to occur. This determination can be on the basis of the fact that the processor 11 is configured to perform speculative reading. Or, the determination can be made by inspecting the initialization code and determining that it has at least one branch. The determination can be made manually or performed automatically by the computer, such as by BIOS 14. If speculative reading is likely to, or certain to, occur, the computer system 10 can be programmed to prevent speculative reading.

Referring again to FIG. 1, BIOS 14 is programmed to include an instruction sequence to prevent speculative reading from taking place. In one embodiment, BIOS 14 provides an instruction sequence that disables speculative reading while memory initialization is taking place. In another embodiment, BIOS 14 instructs processor 11 to flush instruction buffer 11a before any data access during the memory initialization. In the latter case, a command sequence to flush the instruction buffer would occur in the BIOS code before any read after a branch instruction. In either case, processor 11 is prevented from reading ahead and pre-fetching data. In turn, this prevents an erroneous data access from occurring.

A "blanket" approach to preventing the problem is to prevent any processor capable of speculative reading from doing so during memory initialization. A less restrictive approach might be to prevent speculative reading only when a branch, or a certain type of branch, is detected in the code.

Other Embodiments

It should be understood that various changes, substitutions and alterations can be made hereto without departing from the spirit and scope of the appended claims.

What is claimed is:

1. A method of initializing random access memory in a processor-based computer system, comprising the steps of:
   determining whether the processor is configured to perform speculative reading during the memory initialization; and
   controlling the speculative reading, such that no speculative reading occurs during the initialization.

2. The method of claim 1, wherein the determining step is performed automatically by the computer system.

3. The method of claim 1, further comprising the step of determining whether there is at least one branch in the computer code that implements the initialization.

4. The method of claim 1, wherein the initialization is during a BIOS process and the controlling step is initiated by the BIOS process.

5. The method of claim 1, further comprising the step of analyzing the speculative reading to determine whether it will disrupt the memory initialization, prior to the controlling step, and wherein the controlling step occurs in response to the analyzing step.

6. The method of claim 5, wherein the analyzing step determines whether the random access memory interprets address lines as commands.

7. The method of claim 1, wherein the controlling step is performed by disabling the speculative reading.

8. The method of claim 1, wherein the processor has an instruction buffer and wherein the controlling step is performed by flushing the instruction buffer.

9. A method of using a BIOS process to initialize random access memory in a processor-based computer system that uses speculative reading, comprising the steps of:
   storing at least one instruction in BIOS memory, the instruction operable to prevent speculative reading; and
   executing the instruction such that speculative reading is prevented during power-on-self-test memory initialization of the random access memory.

10. The method of claim 9, wherein the instruction disables the speculative reading process.

11. The method of claim 9, wherein the processor has an instruction buffer and wherein the instruction flushes the instruction buffer.

12. The method of claim 9, further comprising the step of determining whether the code for the BIOS process has a branch, and wherein the executing step is performed in response to the determining step.

13. The method of claim 9, wherein the code for the BIOS process has a CAS latency rating branch, and wherein the executing step prevents speculative reading in response to the branch.

14. The method of claim 9, wherein the code for the BIOS process has a slot position branch, and wherein the executing step prevents speculative reading in response to the branch.

15. An improved ROM BIOS that stores a BIOS process, the improvement comprising:
   at least one instruction that prevents speculative reading from occurring during initialization of a random access memory.

16. The ROM BIOS of claim 15, wherein the instruction disables the speculative reading process.

17. The ROM BIOS of claim 15, wherein the instruction flushes an instruction buffer.

18. The ROM BIOS of claim 15, wherein the instruction prevents speculative reading in response to a CAS latency rating branch.

19. The ROM BIOS of claim 15, wherein the instruction prevents speculative reading in response to a slot position branch.

20. A computer system that executes a BIOS process, one of whose functions is initialization of random access memory, comprising:
   a processor that performs speculative reading;
   a random access memory that stores instructions to be executed by the processor; and
   a ROM BIOS that stores at least one instruction that prevents speculative reading from occurring during power-on-self-test initialization of the random access memory.

21. The computer system of claim 20, further comprising the instruction operable to disable the speculative reading process.

22. The computer system of claim 20, further comprising at least one instruction buffer, and wherein the instruction flushes the instruction buffer.

23. The computer system of claim 20, further comprising the instruction operable to prevent speculative reading in response to a CAS latency rating branch.

24. The computer system of claim 20, further comprising the instruction operable to prevent speculative reading in response to a slot position branch.

* * * * *